No. 825,907.
PATENTED JULY 17, 1906.
C. F. HUBER.
WATER FILTER.
APPLICATION FILED APR. 11, 1906.
2 SHEETS—SHEET 1.
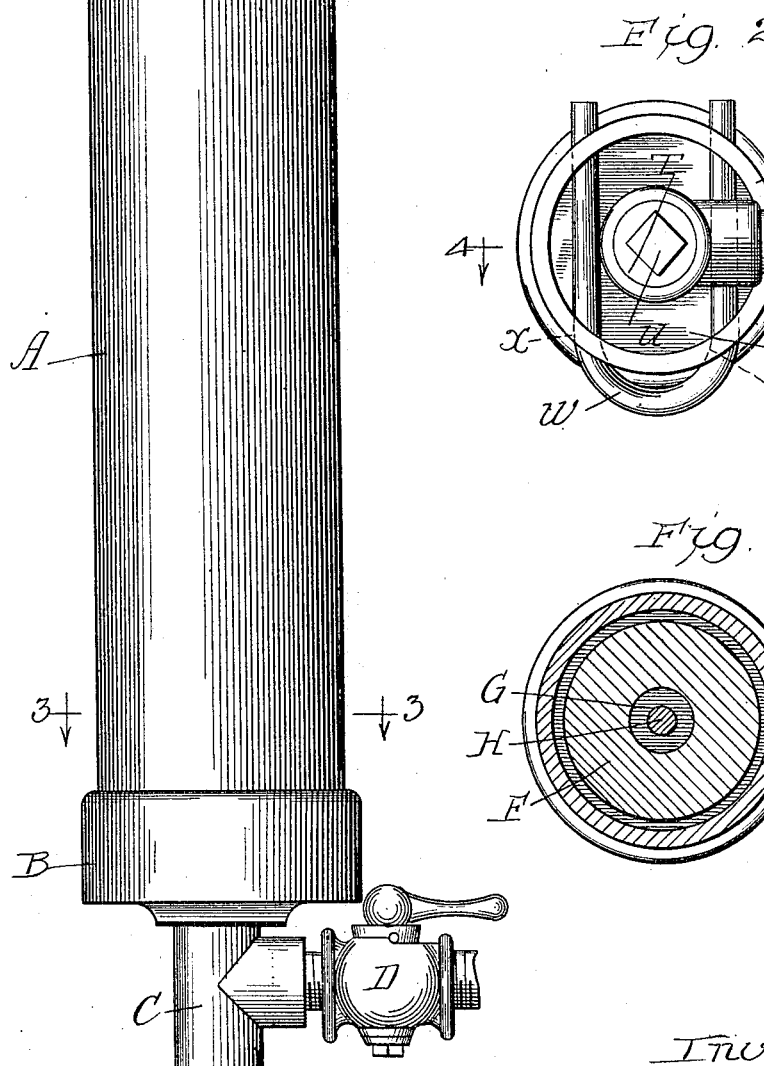
Inventor:
Charles Franklin Huber
By Morgan & Rubinstein Atty's

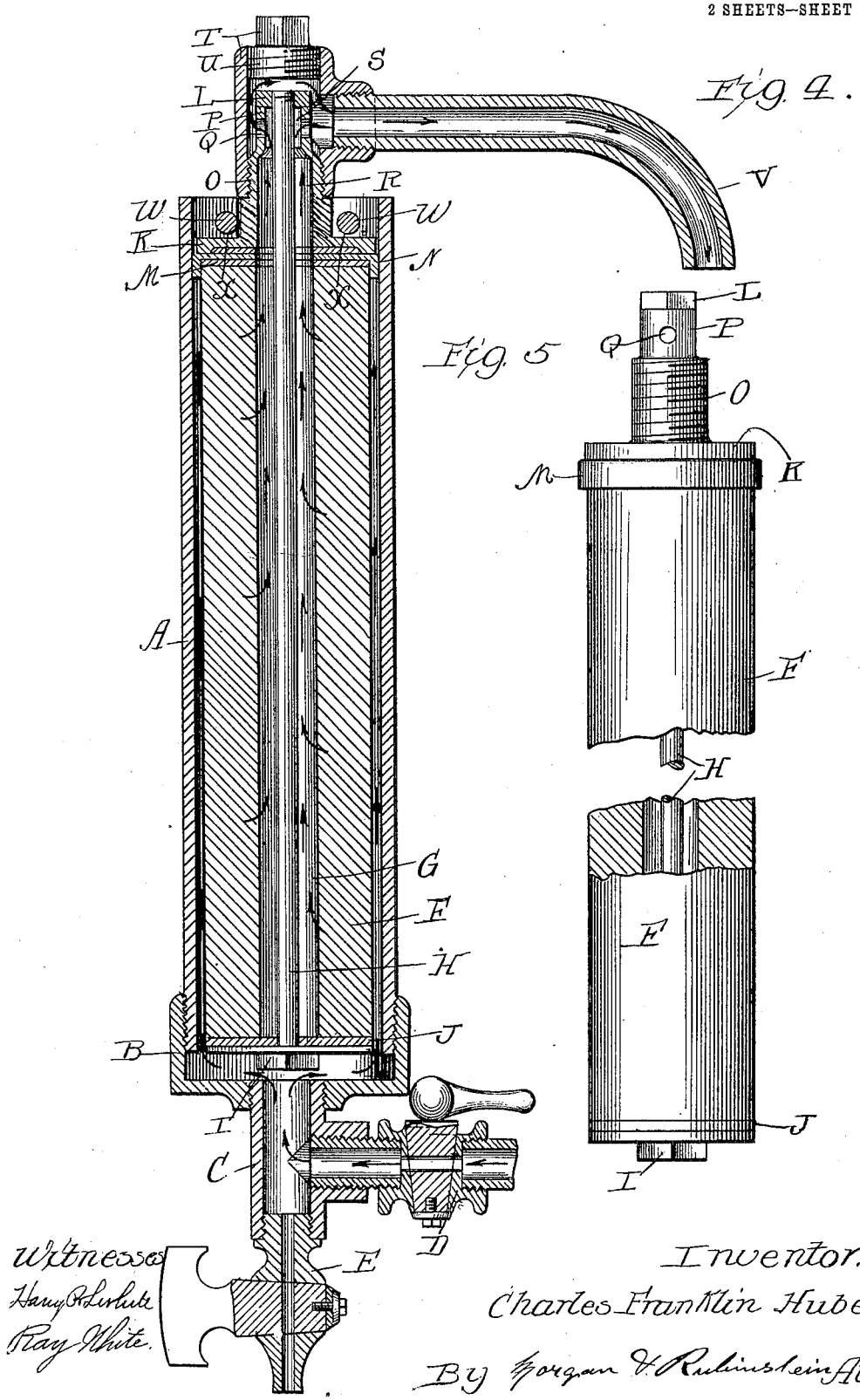

UNITED STATES PATENT OFFICE.

CHARLES FRANKLIN HUBER, OF OMAHA, NEBRASKA.

WATER-FILTER.

No. 825,907.     Specification of Letters Patent.     Patented July 17, 1906.

Application filed April 11, 1906. Serial No. 311,123.

*To all whom it may concern:*

Be it known that I, CHARLES FRANKLIN HUBER, a citizen of the United States, residing at 1301 Farnam street, in the city of Omaha, in the county of Douglas and State of Nebraska, have invented a new and useful Improvement in Water-Filters, of which the following is a specification.

My invention relates to that class of water-filters which are attached to the ordinary water-service fixtures in dwellings and other places and adapted for general and private use.

The object of my invention is to provide a water-filter simple, compact, and cheap in construction, easily attached to the water-service fixtures, instantly separable for cleaning and for a renewal of the filter substance, and that will remove all organic substances from the water which passes through it.

The manner in which I accomplish my object is described in the following specification and illustrated in the accompanying drawings, in which—

Figure 1 is a vertical elevation of the filter complete and ready for attachment to the water-service fixtures. Fig. 2 is a top plan view. Fig. 3 is a cross-sectional view on the line 3 3, Fig. 1. Fig. 4 is a cross-sectional view on the line 4 4, Fig. 2. Fig. 5 is a view of the filter substance and its fittings, the filter-stone being broken away to show the center rod running through it.

In the drawings, A is a casing having an open top tapered on the inside edge and pierced with four holes. On the bottom is a diminishing coupling B. Connected with the coupling B is a T-coupling C. Connected to this coupling is a supply-cock D and a drain-cock E, the supply-cock being adapted to be connected to the water-service fixtures and to thereby support the filter in position for use.

F is the filter proper, consisting of a porous stone. The stone, as shown, and the case in which it is insertible are cylindrical; but I do not wish to be restricted to that form, as the exterior form is a matter of taste and convenience and not essential to my improvement. Extending through the center of the stone is a water-chamber G. Through the center of this chamber is a rod H, threaded at both ends. Supported on the bottom end of this rod is a nut I, and between this nut and the end of the stone is a gasket J, which closes that end of the water-chamber. Slipped over the other end of the rod is a top plate K, adapted to be secured and adjusted by a nut L on the rod H. Between this plate and the top of the stone is a gasket M, which is held in position on the stone by the plate K. This gasket is flanged and adapted to be compressed between the top end of the stone and the inside of the case and to thereby form a water-tight joint N. The plate K has a threaded cylindrical extension O, diminished in size at the top P, which is pierced by several holes Q. A part R of the interior of this extension of the plate registers with and forms a continuation of the water-chamber in the stone and is reduced in size at S to conform to the exterior. Screwed onto the threaded part of the plate K is a T-coupling T, closed with a plug U at the top and supporting a nozzle V. The filter-stone and fittings attached to it are insertible and removable in and from the case for cleaning or repairs and are secured in the case by a U-shaped latch-bar W, which is insertible in the holes X in the case and which holds the filter in the case against the lifting pressure of the water which surrounds the filter-stone below the water-tight joint formed by the gasket M.

When the filter is constructed as described and illustrated and is attached to the water-service fixtures and the supply-cock D is opened, the water enters the case through the coupling C, raises the filter by its pressure till it engages the latch-bar W, the space below and around the filter is filled with water, which is held therein by the gasket M. As the water filters through the porous stone into the chamber G it is forced up through the center part of the plate K and out through the holes Q into the coupling and out through the nozzle.

It is obvious that the casing may be made with a solid bottom and any suitable supply-cock fitted directly therein or through the side near the bottom and that the fittings on the filter-stone may be modified in shape and construction. It is also apparent that the filter-stone and its fittings are revoluble in the case, and hence the nozzle may be turned in any position for use.

What I claim, and desire to secure by Letters Patent, is—

1. In a water-filter of the kind described the combination of parts and materials comprising a cylindrical case open at one end and closed at the other end by a diminishing coupling; a diminishing coupling attached to said case; a T-coupling secured in the said diminishing coupling; a stop-cock connected with said T-coupling, said cock being adapted to be connected with ordinary water-service fixtures; a drain-cock secured in said T-coupling; a filter-stone having a central chamber therethrough; a rod extending through the center of said chamber in said stone and threaded at both ends; a nut-plate attached to the bottom end of said rod; a gasket supported on said rod and nut-plate and attached thereby to the bottom end of said stone and thereby closing that end of the chamber therein; a flanged gasket supported on said rod and on the top end of said stone; a cylindrical plate secured on said rod and gasket and attached thereto and to said rod by a nut adjustable on said rod and plate, the cylindrical part of said plate being adapted to constitute a continuation of the chamber in said stone and to form an outlet therefrom; a coupling connected with the cylindrical part of said plate covering the outlets therein and adapted to support a nozzle; and a nozzle connected with said coupling; said filter-stone and parts connected with and attached thereto being insertible in said case; and a U-shaped latch-bar insertible in suitable holes in said case; said bar extending across said case and being adapted to prevent said filter from being forced out of said case and to permit its removal therefrom substantially as described and for the purposes specified.

2. In a water-filter of the kind described the combination comprising a tubular case open at one end; a stop-cock connected with the other end, said cock being adapted to be connected with water-service fixtures; a filter-stone having a central aperture; a rod extending through the center of said aperture; a plate adjustably secured at one end of said rod; a gasket supported on said rod and plate, and secured thereby on the bottom of said stone and closing the aperture therein; a cylindrical plate adjustably secured on the other end of said rod the interior of said plate registering with the aperture in said stone and adapted to form an outlet therefrom; a gasket supported by said rod and plate, said gasket being adapted to be secured on the top end of said stone and to form a water-tight joint between said stone and said case; a cap-piece adjustably secured on the cylindrical part of said plate and adapted to cover the outlet from the interior of said plate; a nozzle connected in said cap-piece, said filter-stone and parts attached thereto being insertible in said case; and a latch-bar insertible in suitable holes in said case, said latch-bar being adapted to hold said filter-stone in said case, substantially as described and for the purposes specified.

3. In a water-filter of the kind described, the combination comprising a case having an open end and a closed end; a threaded aperture through said closed end being adapted to admit water into said case; a shut-off cock secured in said aperture, said cock being adapted to be connected with a water-service fixture; a filter-stone having a central aperture; a pair of gaskets adapted to cover the ends of said stone, one of said gaskets being adapted to form a water-tight joint between said stone and said case; means for securing said gaskets to said stone, a plate and means for securing it to said gasket and stone, the interior of said plate being adapted to form a continuation of the aperture in said stone and to form an outlet therefrom; a cap adjustably secured on said plate covering said outlet and adapted to hold a nozzle; a nozzle supported in said cap; said filter-stone and gaskets attached thereto being insertible in said case; and a latch-bar insertible in suitable holes in said case, said latch-bar being adapted to hold said filter-stone in said case, substantially as described and for the purposes specified.

4. In a water-filter of the kind described the combination comprising a case having an open and a closed end; a latch-bar insertible in suitable apertures in the open end of said case; a supply-cock inserted in the closed end of said case and adapted to be connected with water-service fixtures; a filter insertible in said case, said filter consisting of a hollow porous stone; a gasket affixed to said stone and adapted to form a water-tight joint between said stone and said case and slidable therein; a plate covering said gasket and secured thereto and to said stone, said plate being adapted to form an outlet to the hollow part of said stone, and means for securing said gasket and said plate to said stone, substantially as described and for the purposes specified.

5. In a water-filter of the kind described, the combination of a case having one open end and apertures at that end adapted to hold a latch-bar; suitable connections in the closed end adapted to support said case and to admit a supply of water into said case; a filter insertible in said case and adapted to form a water-tight slidable connection with said case, said filter having a central chamber closed below said water-tight connection with the case, and having an outlet above said water-tight connection: a latch-bar insertible in the aperture in the open end of said case, said bar extending across the open end of the case and thereby securing said filter in said case, substantially as described and for the purposes specified.

6. In a water-filter of the kind described, the combination with a case having suitable apertures therein, said case containing an insertible filter, and being adapted to be connected with water-supply service-fixtures and to admit a supply of water; of a latch-bar insertible in said apertures in said case and thereby adapted to secure said filter in said case.

CHARLES FRANKLIN HUBER.

Witnesses:
ROBERT WILSON,
EDWARD RUPKE.